(No Model.)
E. D. WASSELL.
METALLIC WHEEL.
No. 429,253. Patented June 3, 1890.
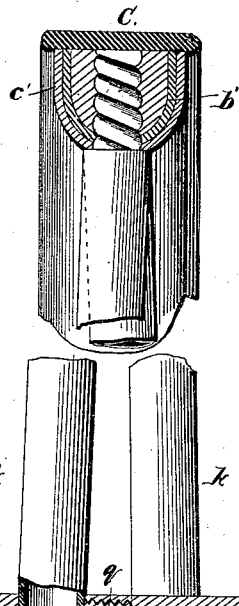
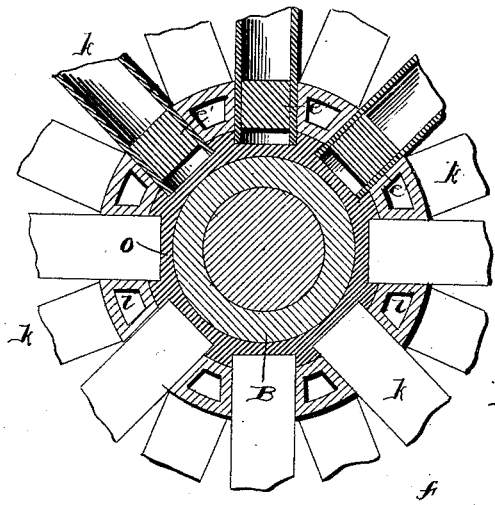
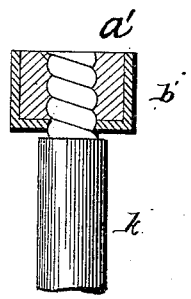
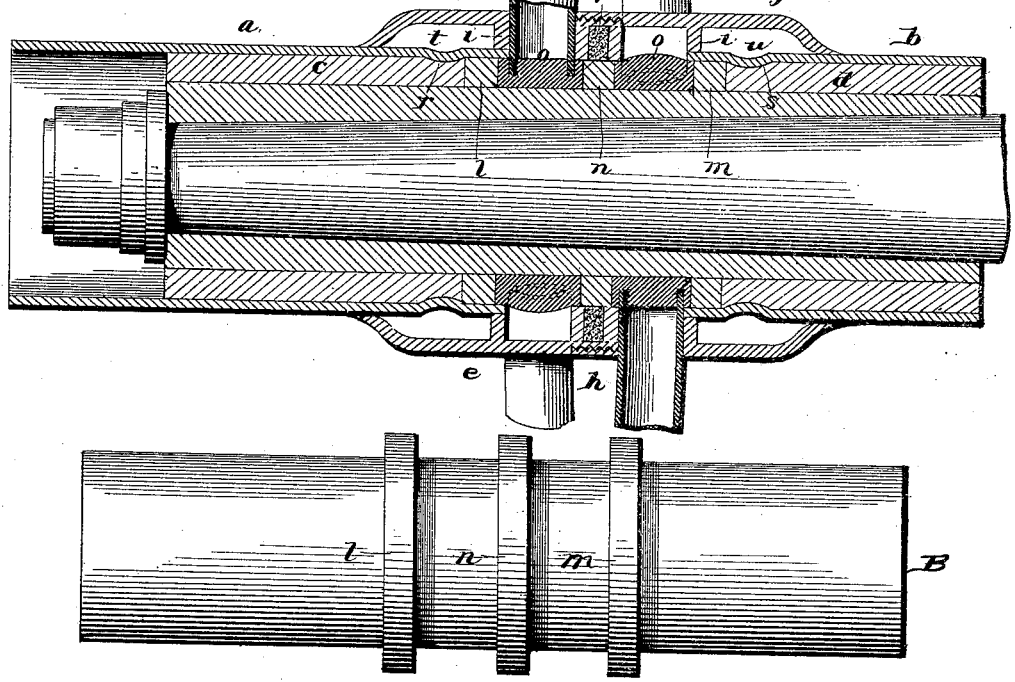
WITNESSES:
Geo. G. Morse
L. S. Whitaker
INVENTOR
Edwin D. Wassell
BY
Johnston Reinohl and Dyne
ATTORNEYS.

UNITED STATES PATENT OFFICE.

EDWIN DAVID WASSELL, OF PITTSBURG, PENNSYLVANIA, ASSIGNOR TO ISABELLA WASSELL, OF SAME PLACE.

METALLIC WHEEL.

SPECIFICATION forming part of Letters Patent No. 429,253, dated June 3, 1890.

Application filed October 1, 1889. Serial No. 325,633. (No model.)

*To all whom it may concern:*

Be it known that I, EDWIN DAVID WASSELL, a citizen of the United States, residing at Pittsburg, in the county of Allegheny and State of Pennsylvania, have invented certain new and useful Improvements in Metallic Vehicle-Wheels; and I do hereby declare the following to be a full, clear, and exact description of the invention, such as will enable others skilled in the art to which it appertains to make and use the same.

My invention relates to vehicle-wheels, and has for its object certain improvements, which will be hereinafter described, and particularly pointed out in the claims.

In the accompanying drawings, which form part of this specification, Figure 1 represents a vertical longitudinal section of my improved wheel; Fig. 2, a vertical transverse section through the hub on line $x\,x$, Fig. 1; Fig. 3, a side elevation of the axle-box; and Fig. 4, a longitudinal section through the box at the outer end of one of the spokes, showing the spoke in side elevation.

Reference being had to the drawings and the letters thereon, A indicates the hub of the wheel, which is formed of tubular sections $a$, section $b$, and lining $c\,d$ in each of said sections, respectively, made of wood, and an outer casing $e$, made in two parts $f\,g$, connected by screw-threads at $h$, and each section $f\,g$ is provided with annular inwardly-projecting sockets $i$, which surround the spokes and form a bearing therefor.

At the inner end of wooden linings $c\,d$ are metallic rings $l\,m$, and midway between said rings is another ring $n$, the three rings forming the walls of spaces around the axle-box B to receive fillings $o\,p$, of rubber, lead, or other analogous soft metal, in which the inner ends of the spokes $k$ are seated. Around the middle ring $n$ and between the two sets of spokes of the wheel is a ring $q$, of wood, against which the opposite or inner sides of the spokes bear.

In constructing the hub of the wheel the linings $c\,d$ are driven into the sections $a\,b$, the former being provided with a groove $r\,s$, respectively, into which the metal of the latter is compressed circumferentially at $t\,u$ to secure the linings in the sections. The linings having been properly bored to receive the axle-box B, the rings $l\,m$ are placed in their respective sections and the ring $n$ of the axle-box. The sections $a\,b$, with their linings, are driven upon the axle-box, and the spaces between said rings filled with lead or analogous soft metal. The wooden ring $q$ is then placed in position, and the outer casing $e$ is applied, and the hub firmly secured together.

Through the outer casing $e$ are holes to receive the spokes, and in the lead filling are formed annular seats $v$ to receive the inner ends of the spokes. The spokes being seated in lead or other soft metal, the ringing sound of the spokes due to their vibrations when in motion is deadened by the lead.

The outer end of each spoke is reduced in diameter and a spiral groove $a'$ formed thereon, and around said end is placed a box $b'$, which conforms to the inner surface of the hollow felly $c'$, and is filled with soft metal $d'$, rubber, or other non-conductor of sound, which acts in conjunction with the lead in the hub at the inner end of the spokes to deaden the noise or sound produced by the vibration of the spokes. The spokes are preferably made of steel tubes, and the felly is also preferably made of the same material.

C indicates the tire, which is applied to the wheel in a heated condition and then shrunk thereon.

The linings $c\,d$ and the ring $q$ may be made of compressed paper-pulp, which is a non-conductor of sound, and further contribute to rendering the wheel noiseless.

The rings $l$, $m$, and $n$ may be cast together by a web connecting them, if desired, and the inner ends of the spokes may be filled with cork, rubber, or other non-conductor of sound, as shown at $e'$ in Fig. 2, and the spokes may be provided with a spiral groove at their inner ends to embed in the rubber or lead in the hub.

In the use of rubber or lead filings or other analogous metals the vibration of the metals composing the wheel is prevented, and consequently any tendency of the different parts of the steel wheel to crystallization is prevented.

It will be noticed that when the inner ends of the spokes are embedded in the hub the force necessary to embed them will cause the lead to fill up the inside of the end of the tubular spoke to the same depth as around the outside, as indicated in Fig. 1.

When the different parts of the hub are put together and the outer sleeve put on and screwed together, the spokes are then put in the hub, and on account of being placed alternately on either side of the thread-joint of the outer sleeve of the hub will prevent the outer sleeve from slackening and coming apart, as the spokes, on account of their relative positions, will form a perfect lock.

In constructing the outer casing e, made in two parts, the metallic sockets i may, if desired, be left off, or they may be set back in the space, so as to leave room for a ring of wood in each section of the outer casing, which would be the same as ring q; or the entire outer casing may be filled with wood in the inside, and when the hub is put together the holes may be bored out in the wood down to the lead rings for the spokes to pass through the wood and enter the lead.

Having thus fully described my invention, what I claim is—

1. In a metallic vehicle-wheel, a metallic hub and a metallic felly, in combination with tubular metallic spokes having their inner ends filled with and embedded in soft metal, rubber, or other non-conductor of sound contained in the hub and surrounding the end of the spokes, substantially as described.

2. In a metallic vehicle-wheel, a hub formed of tubular sections having a lining, a soft-metal filling to receive the spokes, and an outer casing provided with holes for the spokes, substantially as described.

3. In a metallic vehicle-wheel, a hub consisting of lined tubular sections, a soft-metal filling in which the spokes are embedded, and an outer casing provided with inwardly-projecting sockets, substantially as described.

4. In a metallic vehicle-wheel, tubular metallic spokes having boxes at their outer ends filled with soft metal, rubber, or other non-conductor of sound, the ends of the spokes being embedded in said material and secured against longitudinal movement and contained in the felly of the wheel, substantially as described.

5. In a metallic vehicle-wheel, hollow spokes having a spiral groove formed in their outer ends, in combination with a box and a filling of sound-deadening material within the felly of the wheel, substantially as described.

6. In a metallic vehicle-wheel, tubular sections and linings having a circumferential groove, in combination with a depression in the sections engaging with the grooves in the linings, substantially as described.

In testimony whereof I affix my signature in presence of two witnesses.

EDWIN DAVID WASSELL.

Witnesses:
WM. L. CLARK,
W. C. BARR.

It is hereby certifieed that the name of the assignee in Letters Patent No. 429,253, granted June 3, 1890, upon the application of Edward David Wassell, of Pittsburg, Pennsylvania, for an improvement in "Metallic Wheels," was erroneously written and printed "Isabella Wassell," whereas said name should have been written and printed *Ann Isabella Wassell;* and that the said Letters Patent should be read with this correction therein that the same may conform to the record of the case in the Patent Office.

Signed, countersigned, and sealed this 17th day of June, A. D. 1890.

[SEAL.] CYRUS BUSSEY,
*Assistant Secretary of the Interior.*

Countersigned:
    C. E. MITCHELL,
        *Commissioner of Patents.*